Feb. 13, 1951     G. M. BOOTH     2,541,742
DRY FEEDER
Filed July 20, 1946
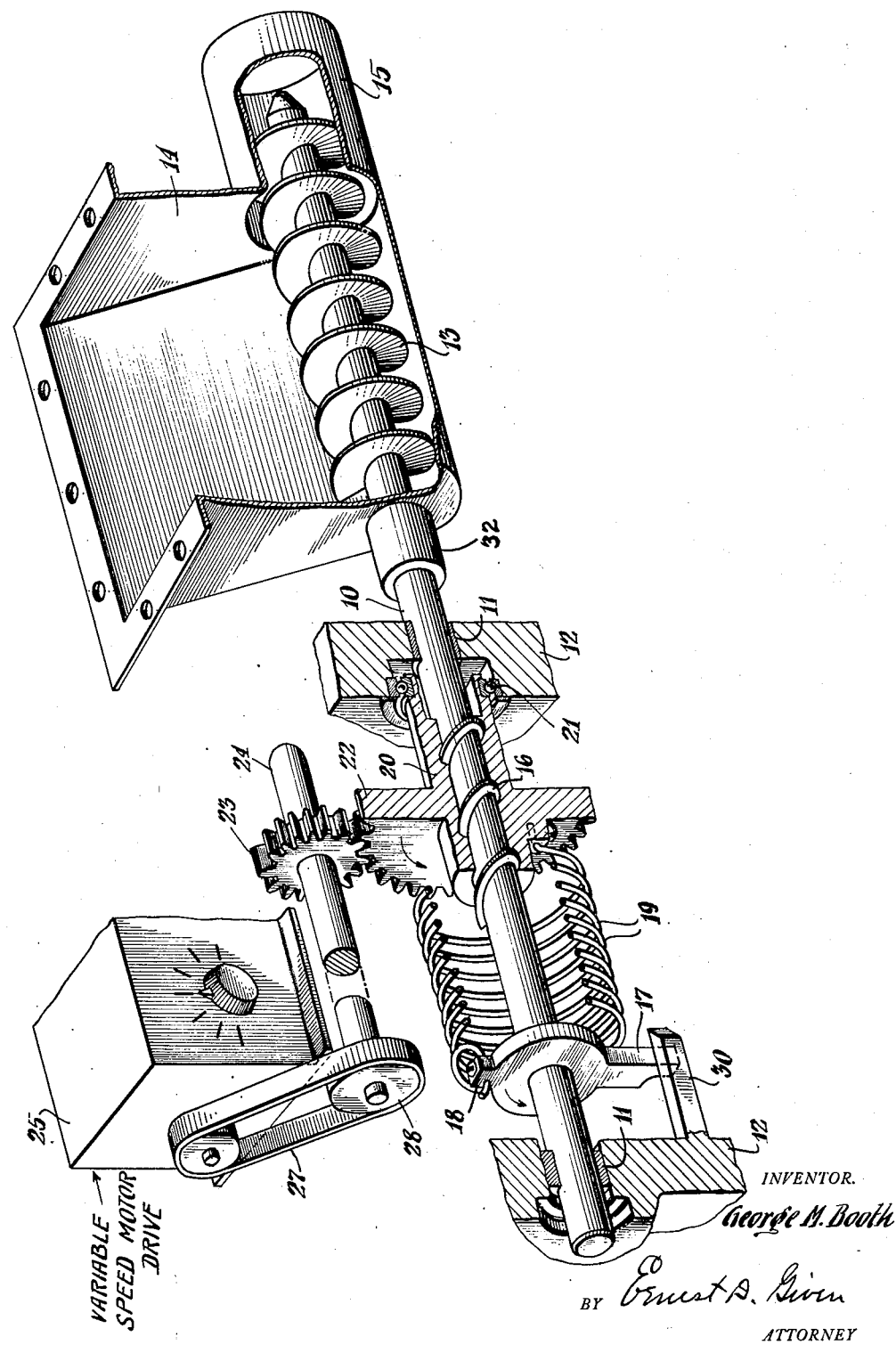
INVENTOR.
George M. Booth
BY Ernest A. Given
ATTORNEY Patented Feb. 13, 1951

2,541,742

UNITED STATES PATENT OFFICE

2,541,742

DRY FEEDER

George M. Booth, Westfield, N. J., assignor to Wallace & Tiernan Co., Inc., Belleville, N. J., a corporation of New York Application July 20, 1946, Serial No. 685,278

14 Claims. (Cl. 198—64)

This invention relates to apparatus, particularly of the screw type, for feeding or conveying divided solids such as powdered, granular, and lump materials of which some examples are dry chemicals, flour, and grain. In a more specific aspect, important embodiments of the invention comprise improved dry feeder devices wherein a novel and particularly effective movement or sequence of motions is imparted to a feed screw, resulting in a more efficient and reliable feeding operation, adapted for any of a wide variety of dry materials, at a substantially continuous yet readily adjustable rate of flow. Among many uses for such apparatus are the introduction of powdered, granular or other non-liquid, divided substances into other dry material or into a stream or other body of fluid, or indeed in any situation where a measured and continuous or substantially continuous feed of such substance is desired.

Helical screws of various designs and constructions have been frequently used for feeding purposes, and whereas in a broader sense the invention is directed to the feed of material under practically any circumstances, as along various types of pipes or conduits, the present improvements are of special utility in feeding means where it is desired to control the rate of flow at a constant value, e. g. to provide for the advance of a determinable, constant bulk volume per unit of time, preferably without special adjustment or other consideration for the precise character of the material being fed.

Heretofore in feeding devices, screws have been conventionally mounted with one end exposed in a bin or hopper or in an extended portion of such container, and with the other end in a tube or trough out of which the material is to pass, the screw itself being arranged for rotation and restrained against axial movement. In operation of such devices the material is carried along as a result of its slippage on the flights of the screw and the simultaneous slippage of the outer surface of the load or charge—i. e. the total body of material which is carried in the flights and which thus has an over-all cylindrical configuration—with respect to the cylindrical surface described or defined, e. g. in the surrounding material, by the helical periphery of the screw. The slippage in the last-mentioned region is partly rotational and partly axial and as indicated, is usually a slippage between the screw charge and the surrounding material in the hopper that the screw traverses and wherein the material is deposited between the flights of the latter.

Under the described circumstances it will be apparent that if slippage did not take place on the flights of the screw, the charge would simply rotate with the latter as a cylindrical body of the material, and no feed would take place. On the other hand, if it were possible to restrain the charge, having such cylindrical shape, from any rotational motion, but at the same time to permit its displacement in an axial direction, the screw would feed an amount of the substance at each revolution exactly equal to the quantity contained in one turn or revolution of the helix. Such a result is unattainable in practice, inasmuch as the force exerted on the material by the flight of the screw is partly axial and partly angular or rotational, and in consequence the rate of feed, even under the best conditions, is somewhat less per revolution than the actual volume of the material that can be contained in one turn of the flight or thread.

The difference by which the feed per revolution is less than the last-mentioned volume, is determined by the friction of the charge of material (in the screw) on the flights relative to the friction of the material at the cylindrical cleavage surface which it tends to have with respect to the substance outside the boundary of the screw. Thus, for instance, if a screw full of material is operated in a very smooth, close-fitting tube, so that minimum friction occurs between the screw charge and the stationary structure, the material of the charge will rotate with the screw at least to a very considerable extent, rather than advance axially. Conversely, if the flights of the screw are smooth and nearly frictionless and the friction between the charge of material and the surrounding body which is not in motion is high, then the rotative displacement of the charge in the screw can be held to a minimum and the axial motion of the charge will approach a maximum—but it can never, for reasons explained above, attain equality in quantity (per revolution of the screw) with the full volume embraced by one turn of the helix.

Accordingly, important objects of the present invention are to eliminate, in a screw feeder, the varying or uncertain effects that may occur because of the relative friction of various localities, and to provide for feed of dry material at a controllable rate that is constant, as measured in volume, and that is preferably independent of the nature of the material. Other objects are to provide improved, simplified, and efficient feeding and conveying apparatus, overcoming difficulties, as of the sort explained above; and still further objects include such as are hereinafter apparent or otherwise incidental to the use and practice of the described improvements.

To these ends it has now been found that the uncertainty or inefficiency due to an attempted balance of frictional relationships may be overcome by providing a back and forth reciprocation of the screw, i. e. in an axial direction, and by rotating the screw only during the back stroke of such reciprocation, i. e. during what may be identified as the loading stroke, the entire cycle of movement being such that the powdered or granular material is displaced axially only when the screw is not rotating. Thus in one example of the invention, where the length of axial oscillation equals the lead of the screw, and where during the forward or feeding stroke of such reciprocation the screw does not revolve but during the back or charging stroke is rotated one revolution, the feed corresponding to a single complete cycle of oscillation is then substantially equal to the amount of material carried in one turn of the screw flight. In other embodiments the screw may make more than one revolution during its loading or charging stroke, but in all cases the length of reciprocation, i. e. the total distance traveled by the screw axially, is equal to the lead of the screw multiplied by the number of revolutions accomplished during the back stroke, in the presently preferred types of apparatus.

In these arrangements the effect is that during the forward stroke the motion of the screw is solely in line with the direction in which it is desired to advance the material, so that during this stroke no appreciable relative motion occurs between the charge of material and the flights of the screw; the only cleavage that occurs is at the cylindrical boundary of the screw and is thus entirely axial. It is assumed in the foregoing that the helix angle of the screw, i. e. the angle between a plane representing the slope of the helix and a plane perpendicular to the screw axis, is not extreme, for example being less than about 15 degrees, and preferably about 10 degrees at the outer periphery of the screw; under such circumstances no rotational movement will be imparted to the load of material. If in special situations it is desired to have a more extreme helical angle, the drag on the charge by the surrounding body of material may induce some rotative slippage, at least of the peripheral portions of the charge, and although some advantage of the improved construction may nevertheless be realized, the efficiency would be reduced to the extent indicated.

With the preferred construction and with the back stroke consisting of one revolution, the quantity of material moved during each cycle will be equal to the volume of one turn of the helix. During the loading or back stroke, the portions of material which already occupy the screw flights and into which the screw further penetrates, remain completely stationary, and the only cleavage that takes place is along the surface of the screw flight or thread, it being understood that the friction or drag between the material that surrounds the periphery of the helix and the charge formed or forming in the flights is sufficient to keep the latter, i. e. the charge, stationary.

Apparatus made in accordance with the above principles has been found to feed dry material in exact proportion to the actual volume of the screw, and such result is accounted for by the absence of simultaneous partial rotation and partial axial movement of the material in the screw. If the periods of the forward and back strokes of reciprocation are equal, actual feeding will occur during only one-half of the time, but in accordance with a presently preferred and notably important feature of the invention, provision is made so that the forward or material-advancing stroke is performed relatively slowly, and the back or loading stroke is accomplished rapidly. The non-feeding period is thereby reduced to a relatively small fraction, say one-tenth or preferably much less, of the total time of each cycle, and in practice it has been found possible to make the duration of the back stroke so short in time that the feed of material appears practically continuous.

By way of illustrative example the drawing presents a somewhat diagrammatic, perspective view with many portions broken away, or in vertical section along the screw axis, of one embodiment of the invention in a device for feeding dry powdered chemical or the like from a hopper and discharging the same through an appropriate passage.

Referring to the drawing, a shaft 10 carried in stationary bearings 11 which may be mounted in the front and rear walls of a gear box 12 fragmentarily illustrated, carries helical flights or threads 13, which thus constitute the feed screw proper. For simplicity of illustration, the screw shown comprises a single continuous helix, having an angle, with an axially perpendicular plane, of about 10 degrees, but it will be appreciated that other configurations or arrangements of screw construction may be employed where desired. The helix operates in the lower part of a hopper 14 having sides tapered toward the screw as shown, and it will be understood that if desired, there may be superimposed a further hopper or box portion (omitted from the drawing, for clarity) in which the dry powdered or granular material can be fed downwardly by gravity or by the aid of suitable stirring or agitating means, not here shown but such, for instance, as the vibrating hopper walls disclosed in United States Patent 2,381,802, to George M. Booth and John S. Ballard, granted August 7, 1945, for Dry Chemical Feeder. The hopper portion 14 has an outlet or discharge tube 15 into which the leading end of the screw projects and which need have only a small clearance around the periphery of the helix.

Along its portion within the gear box 12 the screw shaft 10 has machined on it a male thread 16 having a lead equal to that of the helix 13. The shaft also carries a rigidly mounted arm 17; and a boss or stud 18, mounted with the arm, provides attachment for one end of a helical spring 19 that encircles the shaft. The other end of the coil spring 19 is secured to a facing portion of a sleeve-like member 20 through which the shaft passes and which is machined inside with a female thread engaging the male thread 16 of the shaft. The sleeve member 20, thus threaded on the shaft 10, is not only supported thereby for rotation but is also exteriorly journaled at one end in a thrust bearing 21 in the wall of the gear box. The bearing 21, which may be a ball bearing or other suitable device, is adapted to prevent axial movement of the member 20.

To actuate the mechanism, the sleeve member 20 carries a gear 22 which is in continuous mesh with a driving gear 23 on a drive shaft 24, and the latter is continuously rotated by suitable driving means, which may be any of a variety of types, preferably adjustable in speed. Purely by way of example, a variable speed motor drive mechanism including an electric motor and intermediate gearing, not shown in detail, is indicated at 25, from which power is transmitted by a belt 27 to a pulley 28 on the shaft 24.

With the hand of the helix 13 and the thread 16 as shown in the drawing, i. e., each having a right hand thread, the drive is such that gear 22 is rotated in the direction indicated by the arrow, i. e., counterclockwise as seen from the left side of the figure. It may be noted parenthetically that the helix 13 and thread 16 might as effectively be of left hand thread, provided the direction of drive and the relations of certain other parts are reversed, as will be readily apparent. In the apparatus illustrated, a stationary stop 30 is provided for the arm 17, the stop being conveniently mounted on the inside of the rear wall of the gear box and positioned so as to intercept and arrest the arm 17 in the location shown, and the torsion in the spring 19 being such that the arm is biased against the stop. The entry of the shaft 10 into the hopper is advantageously provided through a stuffing box or seal 32, of suitable construction to prevent undesired escape of the powdered material from the hopper.

Assuming the parts in the position shown, e. g., midway of a feed stroke to the right, rotation of the gear 22 and thus of member 20 causes the shaft 10 to be moved axially to the right, i. e., advancing the screw 13 further into the discharge tube 15, such displacement occurring by reason of the screw threads 16 on the shaft. As the shaft advances, and since it can not rotate because of the mutual engagement of arm 17 and stop 30, the spring 19 is wound tighter, so to speak, and thus the force exerted by the arm on the stop 30 is increased. At the same time the axial progress of the shaft causes the arm 17 to slide to the right along the stop; eventually the arm slides past the end of the stop, whereupon the energy stored in the spring causes the arm structure 17, and with it the shaft 10, to rotate in the direction of the arrow, i. e., counterclockwise as seen from the left. This rotation, which is much more rapid than the rotation of member 20, also causes the shaft to be displaced axially to the left, by virtue of the coaction of the screw threads in the member 20. The shaft 10 thus makes exactly one revolution, since at the end of a complete turn the arm 17, moved back by the concomitant axial displacement of the shaft, then again comes to rest against stop 30. Since the member 20 is kept in continuous rotation, the cycle of operations is thereafter repeated, with the shaft being moved again slowly to the right, while the spring 19 is rewound and the arm 17 slides along the stop 30, so that upon release of the arm, the energy stored in the spring again rotates the arm and the shaft rapidly through a single revolution, while at the same time the shaft is rapidly retracted to the left. Identical cycles of reciprocation and rotation thereafter follow in succession, as long as the shaft 24 continues to be driven.

It will now be seen that if the hopper 14 is filled, say, with a powdered material a few strokes of the mechanism serve to fill the entire helix 13 and the tube 15 with the powder, and from at least that time on, substantially continuous feed of the material through and out of the discharge tube takes place. On the back or loading stroke, while the shaft is being rotated by the spring and moved axially by the advance of the thread 16 in the relatively stationary member 20, the helix 13 is driven through the body of material, simply as a screw in the direction proper to its hand and thus with little or no obstruction. On the forward or discharge stroke, while the arm 17 and the shaft are held against rotation and the movement is simply in an axial direction, the entire helix is moved to the right carrying its load of powdered material and displacing the latter by a shearing operation, so to speak, relative to the stationary body of such material in the hopper. Thus the material is progressively advanced along the screw axis, and on each forward stroke, the material that has reached the leading end of the screw, or in the illustrated example, where the discharge tube projects beyond the limit of the screw path, the material that has reached the outer end of the tube is pushed out or away to the desired locality of use. As explained, the discharge stroke is relatively slow and the loading stroke, when the helix is simply screwed backward into the material in the hopper without otherwise disturbing it, is relatively very rapid, e. g., requiring less than one-tenth of the time of the forward stroke, and as a result the discharge of powdered material from the tube 15 is practically continuous.

Structure of the sort described constitutes a simple and highly efficient feed mechanism, providing a feed that is not only continuous in effect but also is constant at a rate which can be readily varied, for example by adjusting the speed of the transmission to the drive shaft 24 with conventional speed-regulating means, as in the motor drive unit 25. Although various supplemental or auxiliary devices may be employed in the described apparatus (as will now be apparent to persons of mechanical skill), for example such as a dash pot arrangement for the arm 17 and stop 30 to absorb the shock when the arm is stopped, and although other mechanical movements may be employed to impart the same series of motions to the screw—for instance as by rotating the screw intermittently with a Geneva movement while simultaneously providing a synchronized axial oscillation of the screw shaft by movement of the follower of an appropriate cam—the illustrated example is a device that is effective and useful for accomplishing the desired results.

In the illustrated example the continuing slow rotation of the sleeve 20 during the back stroke will make the actual path of reciprocation slightly shorter than the lead of the screw, but no deleterious effect in practical operation or in realization of the described principles has been noted; indeed, if in special cases it is desired to obviate the condition just mentioned, other drive mechanism may be substituted as stated above, or in the device shown the cause may be avoided or reduced by mechanical means, e. g. by making the lead of the thread 16 suitably longer than that of the helix 13. Actually in the specific apparatus shown, the time used in accomplishing the back stroke is in effect a constant, independent of the rate of stroking, and in instances of practice has been found to require between one-tenth and one-twentieth of a second. Thus in circumstances where the machine is driven at a low rate, e. g. one stroke per minute (to provide a correspondingly slow feed), the percentage of time in each cycle used for the back stroke is extremely small; indeed the percentage is still very small even if the rate of feed is accelerated by speeding up the drive to a point, say, where the duration of each cycle is only a few seconds.

As indicated hereinabove, apparatus embodying the principles of the invention provides a feed of the material in substantially true correspondence with the actual volume of the screw. The feed is positive and there is no requirement for a special balance of frictional effects, which in prior types of screw conveyors is apt to vary with the size, shape, density and surface characteristics of the particles of material. A given structure of the present invention may usually be employed with equal success for feeding any one of many different substances, whether finely powdered or coarsely granular, heavy or light, free-flowing or lumpy and sticky. For all the materials the rate of feed, in volume per unit of time, will be the same, and changes in speed of operation will modify the rate in an identical manner for all. Devices such as shown are consequently useful in a wide variety of circumstances where chemicals or other subdivided solids are to be fed, as for use in continuous processes or otherwise where it is desired to maintain a constant but controllable rate of flow. The device of the invention is also particularly useful where a dry material is to be conveyed upward on a slope or even in a vertical direction; the feed is effectively maintained under such circumstances, whereas such operation is not possible with a screw actuated in the conventional manner.

It is to be understood that the invention is not limited to the specific construction herein shown by way of example, but may be embodied in other forms without departure from its spirit.

I claim:

1. Feeding apparatus comprising, in combination, a hopper for material to be fed, having a discharge conduit, a feed screw in the hopper, adapted for axial reciprocation along a path extending into the discharge conduit, means for displacing the screw axially toward the discharge conduit, control means preventing rotation of the screw during said axial displacement, said control means including a stationary stop member, and a control member movable with the screw and engaging said stop member against rotation while the screw is displaced axially toward the discharge conduit, said stop member being disposed to release the control member and thereby to release the screw, for rotation, at the end of the path of said axial displacement of the screw, and spring means connected to the screw and to said displacing means, said spring means being energized by the displacing means and being operable upon release of the control member, for simultaneously displacing said screw axially in the reverse direction and rapidly rotating the screw to advance its threads into material in the hopper.

2. In apparatus of the character described, in combination, a feed screw, and means for reciprocating and rotating the same comprising a shaft connected to the screw and having a threaded portion, a rotatable threaded member engaging said threaded portion to advance the shaft in one direction, position-controlled means holding the shaft against rotation until the shaft has been displaced in the aforesaid direction by rotation of said member to a predetermined locality, and means responsive to release of said holding means for rotating the shaft relatively to said rotatable member to effect return of the shaft and screw axially in the opposite direction while rotating the same.

3. In apparatus of the character described, in combination, a feed screw, and means for reciprocating and rotating the same comprising a shaft connected to the screw and having a threaded portion, a rotatable threaded member engaging said threaded portion to advance the shaft in one direction, position-controlled means holding the shaft against rotation until the shaft has been displaced in the aforesaid direction by rotation of said member to a predetermined locality, and means including a spring connected between said rotatable member and the shaft and adapted to be wound by said member during advance of the shaft in the aforesaid direction, operable upon release of said holding means to rotate the shaft relatively to said member, to effect return of the shaft and screw axially in the opposite direction while rotating the same.

4. In apparatus of the character described, in combination, a feed screw, and means for reciprocating and rotating the same comprising a shaft connected to the screw and having a threaded portion, a rotatable threaded member engaging said threaded portion to advance the shaft in one direction, a stationary stop, an arm on the shaft engaging the stop to hold the shaft against rotation but adapted to slide on the stop for release therefrom when the shaft has been displaced in the aforesaid direction by rotation of said member to a predetermined locality, and means responsive to release of said arm from said stop for rotating the shaft relatively to said member, to effect return of the shaft and screw axially in the opposite direction while rotating the same.

5. In feeding apparatus, in combination, a receptacle having an aperture through which material may be fed, a feed screw therein to advance material through the aperture, driving means for advancing the feed screw axially without rotation to a predetermined outward position, retracting means including an element connected to the driving means to receive and store energy therefrom, for rotating and axially retracting the feed screw, said retracting means being driven by said element during the screw-retracting operation thereof, and means controlled by the feed screw and responsive to arrival of the latter at said outward position, for initiating operation of the retracting means.

6. In feeding apparatus, in combination, a receptacle having an aperture through which material may be fed, a feed screw therein to advance material through the aperture, said feed screw having a threaded portion adapted for drive thereof, a rotatable member in threaded engagement with said threaded portion, journaling means for said member, holding the latter at a fixed distance from the aperture, means for continuously rotating the member to move the feed screw axially in one direction, and means for intermittently moving the feed screw in an opposite axial direction relative to the member.

7. In feeding apparatus, in combination, a receptacle having an aperture through which material may be fed, a feed screw therein to advance material through the aperture, said feed screw having a threaded portion adapted for drive thereof, a rotatable member in threaded engagement with said threaded portion, journaling means for said member, holding the latter at a fixed distance from the aperture, means for continuously rotating the member, and means for intermittently rotating the feed screw relative to the member and with a greater angular velocity in the same direction about the axis of the screw.

8. In feeding apparatus, in combination, a receptacle having an aperture through which material may be fed, a feed screw therein to advance material through the aperture, said feed screw having a threaded portion adapted for drive thereof, and said threaded portion having substantially the same pitch as the feed screw, a rotatable member in threaded engagement with said threaded portion and means in driving relation to the member and feed screw for axially reciprocating the latter toward and away from the aperture and for rotating the screw during each of its strokes in one direction, said last mentioned means comprising means for continuously rotating the member and means engaging the feed screw for displacing the same axially relative to the member.

9. In feeding apparatus, in combination a feed screw having feed threads and having an associated threaded portion of substantially the same pitch as the feed threads, a rotatable threaded member engaging said threaded portion, driving means for continuously rotating the member, to advance the screw axially in one direction, and means for rotating the feed screw relative to the member, to rotate the screw and advance it axially in the opposite direction.

10. In feeding apparatus, in combination, a receptacle for material to be fed, a feed screw therein and means for reciprocatively actuating the screw to advance the material, comprising a continuously rotating drive member, means coupling said member to the screw to advance the latter axially in one direction at a rate proportional to rotation of said member, returning means adapted to deliver power at a rapid rate independent of the rate of rotation of said member, for rapidly rotating the screw and returning the same axially in an opposite direction, a control element movable with the screw, a cooperating stop element disposed to engage said control element for preventing rotation of the screw, said control element being releasable from the stop element upon arrival of the screw at a predetermined position, and said returning means being connected with the feed screw and adapted in response to release of the control element from the stop element, to initiate its return drive of the feed screw immediately upon arrival of the latter at said predetermined position.

11. In feeding apparatus, in combination, a receptacle having an aperture through which material may be fed, a feed screw therein to advance material through the aperture, and means for reciprocatingly actuating the screw for said advance of material, comprising a drive member adapted to be rotated continuously, coupling means continuously engaged between said member and the feed screw, adapted to translate relative rotation between the member and the screw into axial displacement between them in a direction depending on the direction of said relative rotation, said drive member thereby tending to displace the screw continuously in one axial direction, and supplemental driving means intermittently operative between the member and screw for rotating the screw relative to the rotating member in a direction to displace the screw in the opposite axial direction.

12. In feeding apparatus, in combination, a receptacle having an aperture through which material may be fed, a feed screw therein to advance material through the aperture, and means for reciprocatingly actuating the screw for said advance of material, comprising a drive member adapted to be rotated continuously, coupling means continuously engaged between said member and the feed screw, adapted to translate relative rotation between the member and the screw into axial displacement between them in a direction depending on the direction of said relative rotation, said drive member thereby tending to displace the screw continuously in one axial direction, intermittently operative supplemental driving means connected between the member and screw for rotating the screw in the same direction as the member but at a faster rate relative thereto, to displace the screw in the opposite axial direction while turning the screw relative to the receptacle, a stationary stop member, and a stop-engaging member carried with the screw and adapted to abut the stop member for holding the screw against rotation, at least one of said stop and stop-engaging members being elongated parallel to the axis of the screw, to permit axial displacement of the screw and stop-engaging member while the stop-engaging member remains in abutment with the stop member, said stop member being mounted in such position relative to the axial path of the stop-engaging member carried with the screw, as to maintain said abutment of the stop and stop-engaging members while the drive member advances the screw axially in a forward stroke from a rear position to a predetermined forward position, and said stop member being shaped and disposed so that the stop-engaging member is released from its rotation-restraining abutment with the stop member when the screw reaches said forward position, so as to permit rotation of the screw through a predetermined angular distance relative to the receptacle, for effectuating a reverse stroke of the screw by the supplemental driving means.

13. The apparatus of claim 12 in which the supplemental driving means comprises a spring connected between the drive member and screw to be tensioned by the rotation of the drive member during the forward stroke, for exerting driving torque on the screw relative to the member when the stop-engaging member is released from the stop member.

14. In feeding apparatus, in combination, a receptacle having an aperture through which material may be fed, a feed screw disposed therein for advance of material through said aperture, and means including a continuously moving drive member, for reciprocating said feed screw to and from a predetermined forward position and for proportioning the duration of each complete stroke solely to a predetermined extent of motion of the drive member, said means including means which comprises a supplemental driving device adapted to move in a reverse direction to and at a faster rate than the drive member, for displacing the screw rearwardly from said position, means including a continuously engaged driving connection between the screw and said continuously moving member, for differentially coupling said screw to said displacing means and said member so that said drive member continuously tends to displace the screw in the forward direction and so that said displacing means, upon operation thereof, opposes and overcomes the drive of said continuously moving member, to effect a rearward stroke of said feed screw, and means connected with the screw and the displacing means and responsive both to axial disposition of the screw and to a predetermined displacement of the displacing means, for initiating operation of the latter upon arrival of the screw at the aforesaid predetermined position and for interrupting said operation upon completion of said predetermined displacement.

GEORGE M. BOOTH.

REFERENCES CITED

The following references are of record in the file of this patent:

UNITED STATES PATENTS

| Number | Name | Date |
|---|---|---|
| 1,757,401 | Thomas | May 6, 1930 |
| 1,975,015 | Murphy | Sept. 25, 1934 |